United States Patent [19]

Svensson

[11] Patent Number: 4,836,599
[45] Date of Patent: Jun. 6, 1989

[54] VEHICLE VISOR INSTALLATION

[75] Inventor: E. Gunnar Svensson, Malung, Sweden

[73] Assignee: Autopart Sweden AB, Malung, Sweden

[21] Appl. No.: 171,024

[22] Filed: Mar. 21, 1988

[30] Foreign Application Priority Data

Apr. 3, 1987 [SE] Sweden .................................. 8701409

[51] Int. Cl.⁴ .............................................. B60J 3/00
[52] U.S. Cl. ................................ 296/97.5; 296/97.11; 350/277
[58] Field of Search ............... 296/97 H, 97 R, 97 B, 296/97 G, 97 J, 97 K; 350/277, 606, 638

[56] References Cited

U.S. PATENT DOCUMENTS

| | | | |
|---|---|---|---|
| 2,458,677 | 1/1949 | Brundage. | |
| 2,549,395 | 4/1951 | Short | 296/97 C |
| 3,008,758 | 11/1961 | McCormick | 296/97 G |
| 3,085,827 | 4/1963 | Cederberg et al. | 296/97 H |
| 4,491,360 | 1/1985 | Fleming. | |

FOREIGN PATENT DOCUMENTS 3136494 8/1986 Fed. Rep. of Germany.

Primary Examiner—Robert B. Reeves
Assistant Examiner—Brian Sells
Attorney, Agent, or Firm—Young & Thompson

[57] ABSTRACT

The invention relates to a motor-vehicle sun visor installation. The installation includes visor panels (10) which are configured in a manner to provide a complete screen across the upper part of the vehicle windscreen in combination with a box (13) located around the rear view mirror (2) of the vehicle. The outer edge surfaces (19) of respective visor panels are inclined to conform with the inclination of the windscreen posts (20). The visor panels are mounted for lateral movement, so as to enable the panels to be raised fully against the ceiling of the vehicle.

3 Claims, 1 Drawing Sheet

VEHICLE VISOR INSTALLATION

The present invention relates to a motor vehicle visor installation which includes two visor panels, each of which is pivotally mounted on the upper edge of the vehicle windscreen or windshield on a respective side of a rear view mirror.

When dimensioning and mounting vehicle windscreen visors, it is highly problematic to provide a visor installation which will not leave areas of the windscreen unscreened. The majority of visor installations, or assemblies, leave larger or smaller areas of the windscreen unscreened, partly between the outer side edges of respective visor panels and the vehicle side posts located adjacent the windscreen, and partly between the mutually opposing side edges of the visor panels themselves. This is partly because the side posts are normally inclined to the vertical, which means that in order to be able to raise a panel fully against the ceiling or headliner of a vehicle, the panel must be configured so as to leave a triangular "gap" between its outer edge and the side post adjacent thereto, and partly because the distance between the mutually facing, inwardly located side edges of the visor panels may not be shorter than the horizontal extension of the rear view mirror, so that the mirror will not impede the up and down movement of respective visor panels.

In an attempt to solve this latter problem, a certain reduction in the unscreened centre area of the windscreen has been achieved with visor constructions in which small parts of the visor panels which do not protrude beneath the upper edge of the mirror can be moved closer to the mirror mounting. This solution, however, is only effective when the downwardly swung visor panels and the mirror lie in one and the same plane. It is often desired to lower the visor panel into abutment with the windscreen, wherewith the advantages afforded by this particular solution are substantially impaired when the mirror has only a small vertical extension and results in the exposure of a relatively broad unscreened gap between the side edges of the mirror and the respective visor panels, as seen by the vehicle driver or passenger.

The object of the present invention is to provide a novel sun visor installation of the kind described in the introduction which will eliminate the occurrence of unscreened areas in a simple and aestetic fashion, such that unbroken screening of the upper part of the windscreen can be achieved.

This object is realised in accordance with the invention by means of a sun visor installation in which the extension of respective visor panels in the transverse direction of the vehicle is greater than the distance between the side edges of the rear view mirror and the outer edges of the ceiling of the vehicle; in which respective visor panels can be displaced laterally in a manner to afford mobility between a raised position, in which the inner edges of the panel lie inwardly of the side edges of the rear view mirror, and a lower position in which said inner edges lie outwardly of the side edges of said mirror, and in which an auxiliary screening element is arranged in the proximity of the rear view mirror, such as to screen the windscreen in an area between the inwardly located side edges of the panels and to achieve together with said panels continuous screening of an upper part of the windscreen.

This lateral moveability of the visor panels enables the panels to be given a configuration such that in its downwardly swung position the panel can extend from one side edge of the mirror right to the proximity of the windscreen post, wherein the side edge of the panel can be connected to said post or to an adjacent post, so that no "gap" will remain. By providing a box whose rear wall supports or forms the rear view mirror and which extends forwardly onto the windscreen, there is obtained a screening element which will retain its screening function even when the visor panels are lowered beyond a truly vertical position.

The invention will now be described in more detail with reference to an exemplifying embodiment thereof illustrated in the accompanying drawing, in which FIG. 1 is a schematic, perspective view seen from inside the front compartment of a vehicle, illustrating a conventional visor installation;

Figure 1:
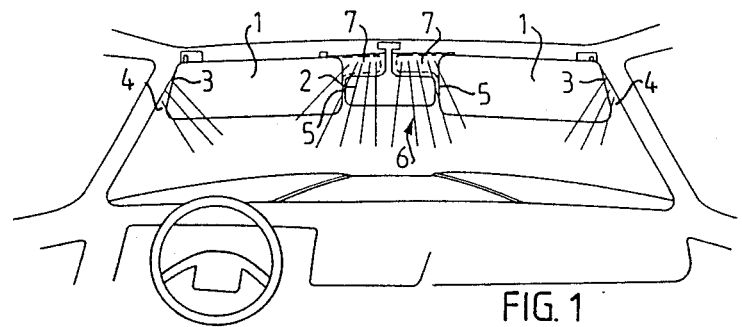

FIG. 1 illustrates a visor installation which includes two conventional visor panels 1 mounted on respective sides of a rear view mirror 2. As a result of the particular external configuration defined by edges 3 of the known visor panel, this configuration being contingent on the requirement that it must be possible to raise the panel fully against the ceiling or headliner of the vehicle, there are left unscreened or unshielded windscreen parts 4 through which dazzling light can pass and blind the driver or passenger seated in the front of the vehicle. Furthermore, in the case of this known visor construction, an unscreened area 6 occurs in the region between the mutually opposing and inwardly facing side edges 5 of the visors behind the rear view mirror. The size of this unscreened area 6 can be reduced, by extending the visor panels 1 across and above the mirror, as indicated by the visor parts 7 shown in ghost lines in FIG. 1. The central part of the windscreen can be screened essentially completely in this way, provided that the mirror and respective visor panels lie in one and the same plane when the visor panels occupy their vertical positions. However, gaps will occur in the shield as soon as the visor panels are raised beyond a truly vertical position, these gaps increasing in size with the increasing extent to which the panels are raised.

Figure 2A:
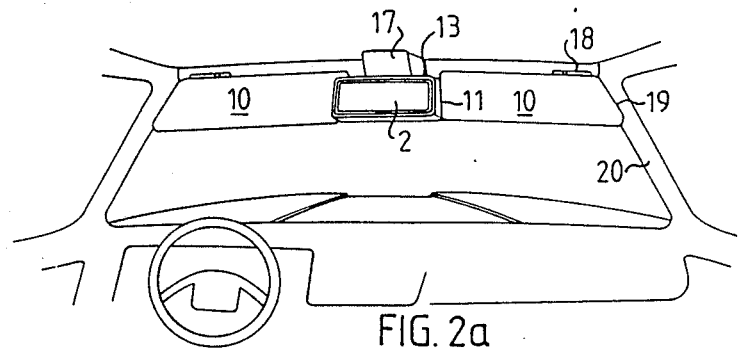
FIG. 2a is a view corresponding to FIG. 1, but illustrating an inventive sun visor installation, with both visor panels being shown in their respective lower positions.
Figure 2B:
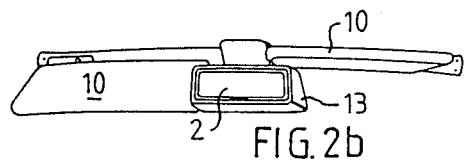
FIG. 2b is a view corresponding to FIG. 2a, but showing one visor panel in its raised position.
Figure 3:
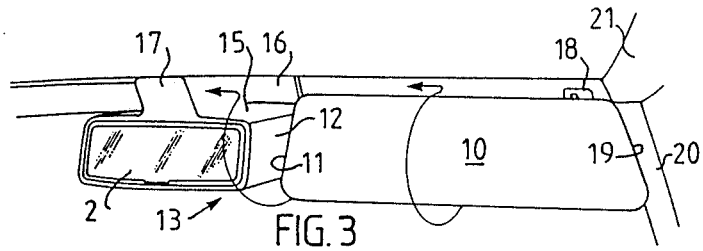
FIG. 3 is an enlarged perspective view of part of the inventive installation illustrated in FIGS. 2a and 2b.

These drawbacks are not found with the inventive sunvisor construction illustrated in FIGS. 2 and 3. The visor panels 10 of the inventive construction have inwardly located side edges 11, which lie adjacent the side walls 12 of a box 13, which carries the rear view mirror. The box 13, which extends rearwardly up to the windscreen, has an upper wall 15 which is spaced slightly from the vehicle ceiling, the vertical extension of this space being somewhat larger than the thickness of respective panels in the case of the illustrated embodiment, and merges with an attachment part 17 which has light-impermeable parts 16 facing the windscreen. Each visor panel 10 has a mounting 18 which includes a rod by means of which the panel can be moved laterally in relation to the mounting, in a known manner.

As illustrated in FIGS. 2a and 3, the respective visor panels 10 have outwardly located end edges 19 which are inclined in a manner to conform to the angle of inclination of the side post 20, so that when the panels are lowered a screening effect is obtained to the very proximity of the side posts. The area between the visor panels is screened by the box 13, which, because the side walls 12 extend to the windscreen, will retain its screening effect even when the visor panels are lowered to positions beyond a truly vertical position.

In order to be able to raise the visor panels 10 fully against the ceiling or headlining of the vehicle, it is necessary for the outer ends 19 of respective visors to be able to pass the upper section 21 of respective door openings. This is made possible by the ability to move respective panels laterally in the space located between the ceiling and the upper wall 15 of the box.

The box 13 may also be used to house, for instance, a radio, journey processors, selected instruments, an electric rear-mirror motor, warning lights, etc.

It is possible within the concept of the invention to replace a complete box 13 with a simplified structure comprising solely two side walls corresponding to the walls 12, i.e. a structure in which the upper and bottom walls of the box are omitted. These simple side walls may be fixed or hinged. In this latter case, the walls may be hinged to the side edges of the mirror, so as to enable the walls to be folded behind the mirror, either fully or partially, when not in use.

I claim:

1. A motor-vehicle visor installation comprising two visor panels which are pivotally mounted on the upper edge of a windscreen on respective sides of a rear view mirror, characterized in that the extension of respective visor panels (10) in the transverse direction of the vehicle is greater than the distance between the side edges of the rear view mirror (2) and the outwardly located edges of the vehicle ceiling; in that the visor panels are laterally displaceable in a manner to afford movement between a panel raised position, in which the inwardly located side edges (11) of respective panels lie inwardly of the side edges of the rear view mirror, and a panel lowered position, in which the inwardly located edges lie externally of the side edges of the rear view mirror, and in that an auxiliary screening element (13) is arranged in the proximity of the rear view mirror and is effective in screening that part of the windscreen located between the inwardly located edges of respective panels and, together with the panels, of forming a continuous screen across an upper part of the vehicle windscreen, the auxiliary screening element (13) comprising two vertical wall parts (12) which form part of the rear mirror mounting and/or are connected thereto and which extend from the side edges of the mirror to the proximity of the windscreen.

2. An installation according to claim 1, characterized in that the outer edges (19) of respective visor panels (10) are inclined in a manner such that when respective panels occupy their lowered positions said outer edges will extend essentially parallel with the side posts (20) of the windscreen.

3. A motor-vehicle visor installation comprising two visor panels which are pivotally mounted on the upper edge of a windscreen on respective sides of a rear view mirror, characterized in that the extension of respective visor panels (10) in the transverse direction of the vehicle is greater than the distance between the side edges of the rear view mirror (2) and the outwardly located edges of the vehicle ceiling; in that the visor panels are laterally displaceable in a manner to afford movement between a panel raised position, in which the inwardly located side edges (11) of respective panels lie inwardly of the side edges of the rear view mirror, and a panel lowered position, in which the inwardly located edges lie externally of the side edges of the rear view mirror, and in that an auxiliary screening element (13) is arranged in the proximity of the rear view mirror and is effective in screening that part of the windscreen located between the inwardly located edges of respective panels and, together with the panels, of forming a continuous screen across an upper part of the vehicle windscreen, the rear view mirror (2) being incorporated in the rearwardly located wall of a box (13), the side walls (12) of which extend to the windscreen, the upper edge surfaces of the side walls lying at a distance from overlying vehicle parts such as to enable respective visor panels to be moved laterally in over the upper edges of said side walls.

* * * * *